Aug. 22, 1961  H. A. JEWETT  2,996,942
KEYBOARDS AND ACCESSORIES
Filed May 15, 1956  10 Sheets-Sheet 1

FIG. I.

INVENTOR
Harold A. Jewett.

Aug. 22, 1961 H. A. JEWETT 2,996,942
KEYBOARDS AND ACCESSORIES
Filed May 15, 1956 10 Sheets-Sheet 3
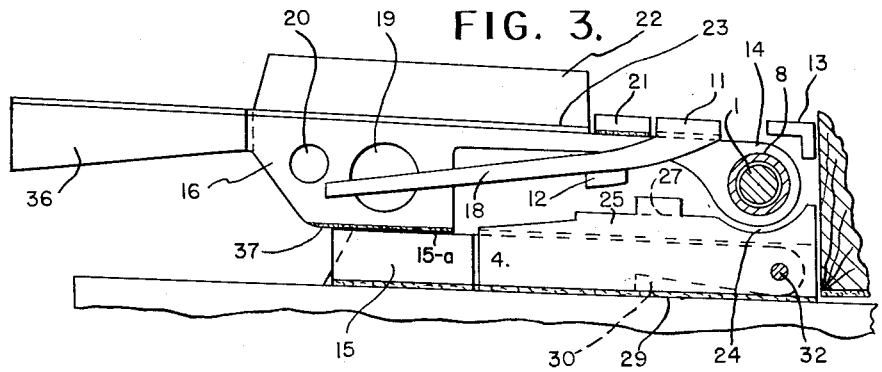
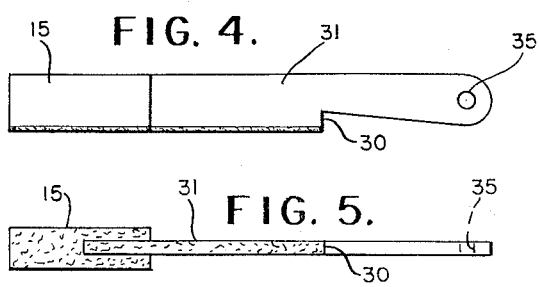
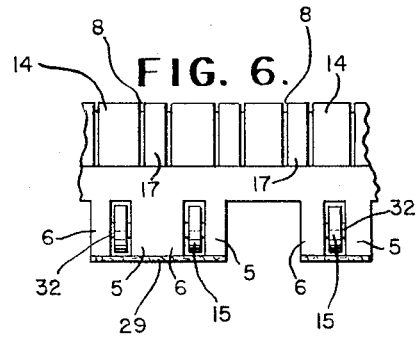
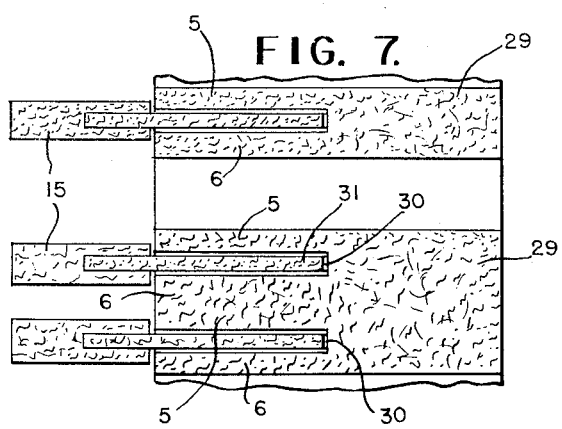
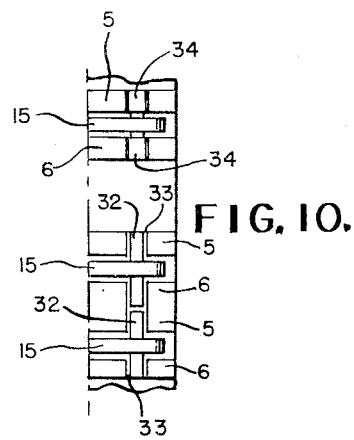
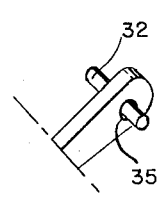
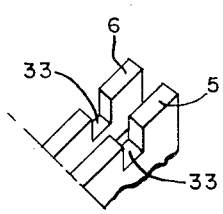
INVENTOR
Harold A. Jewett

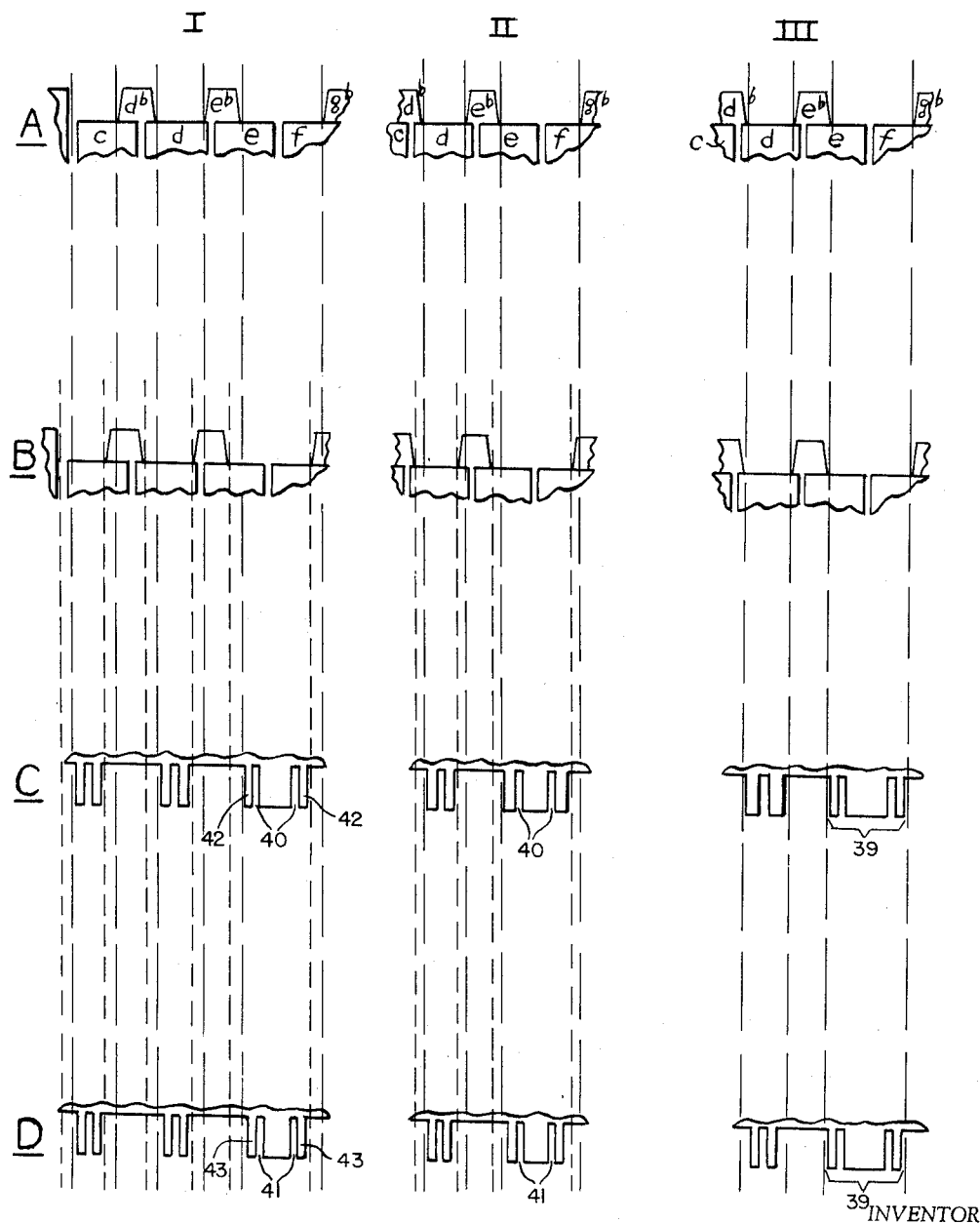

Aug. 22, 1961
H. A. JEWETT
2,996,942
KEYBOARDS AND ACCESSORIES
Filed May 15, 1956
10 Sheets-Sheet 5
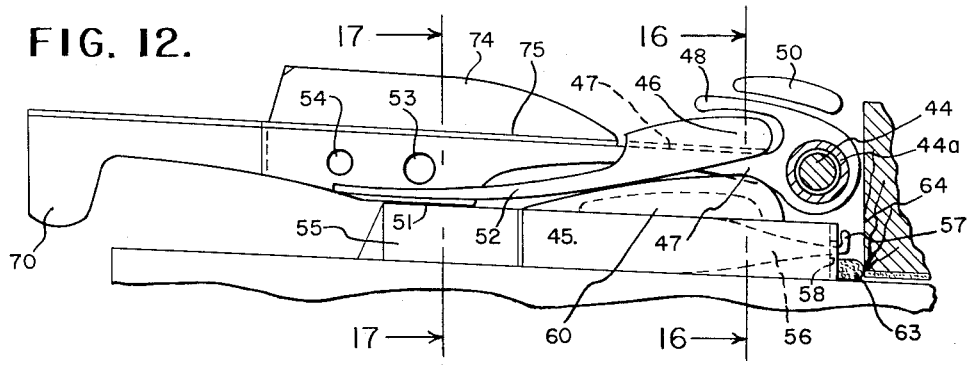
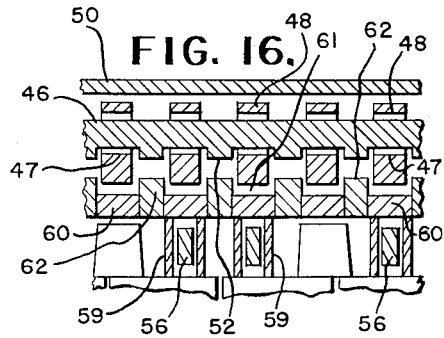
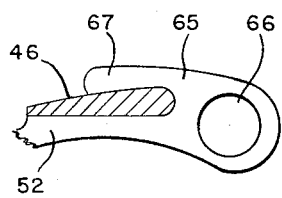
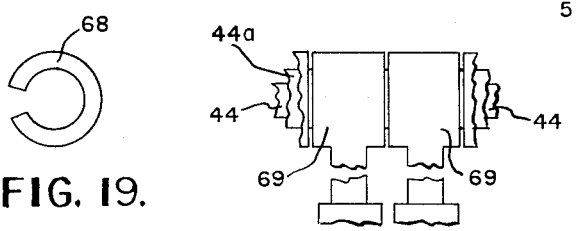
INVENTOR
Harold A. Jewett.

Aug. 22, 1961   H. A. JEWETT   2,996,942
KEYBOARDS AND ACCESSORIES
Filed May 15, 1956   10 Sheets-Sheet 6

INVENTOR
Harold A. Jewett.

Aug. 22, 1961     H. A. JEWETT     2,996,942
KEYBOARDS AND ACCESSORIES
Filed May 15, 1956     10 Sheets-Sheet 7

INVENTOR

*Harold A. Jewett.*

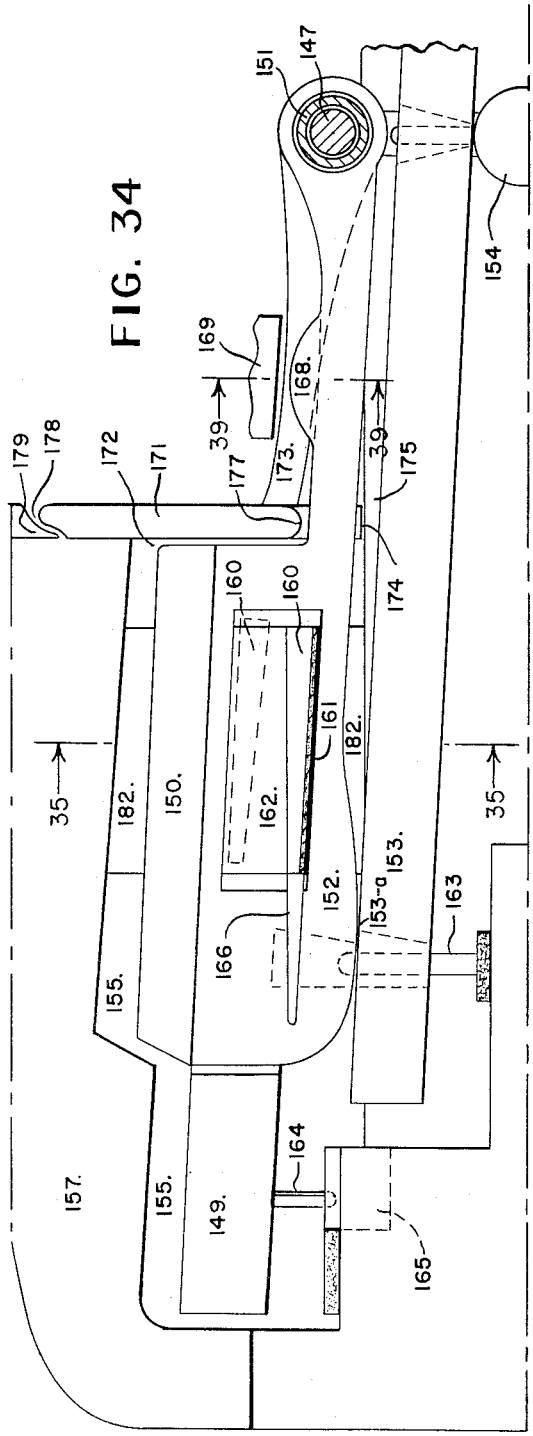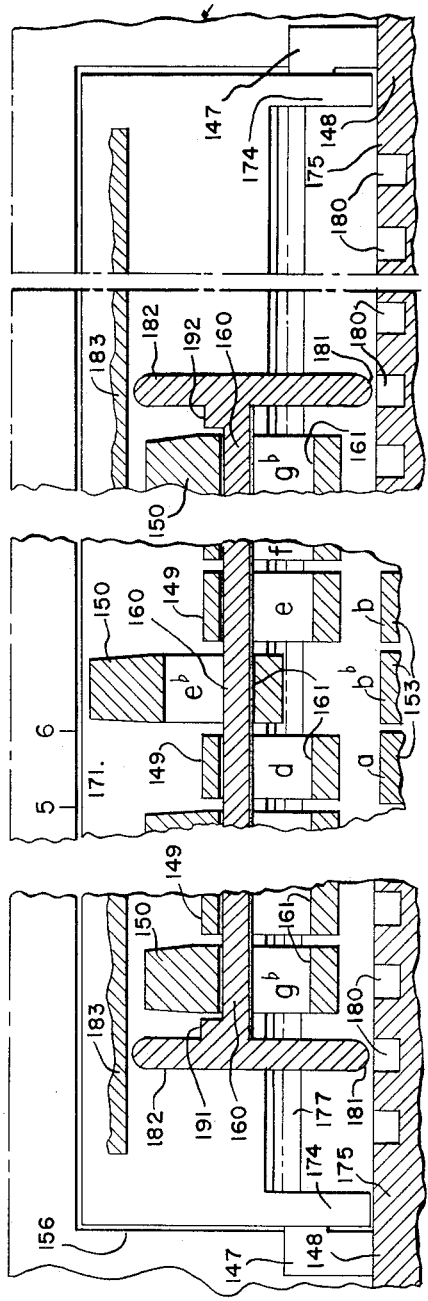

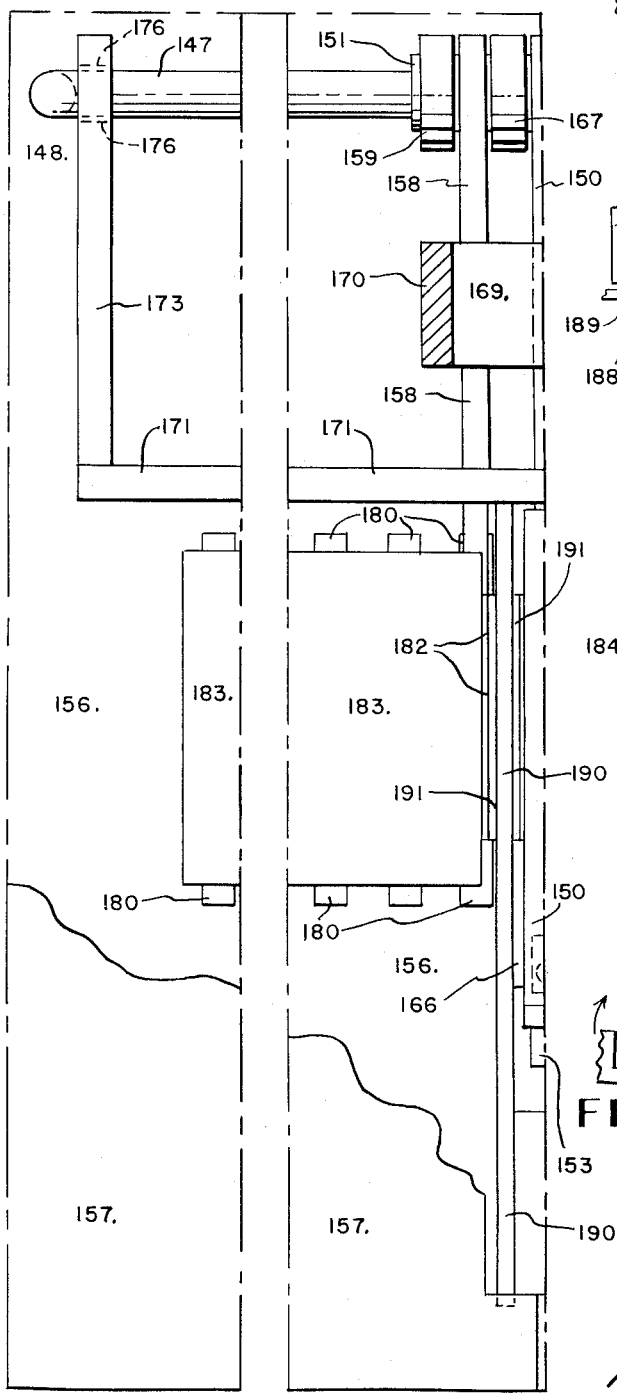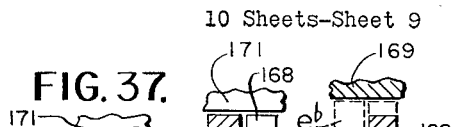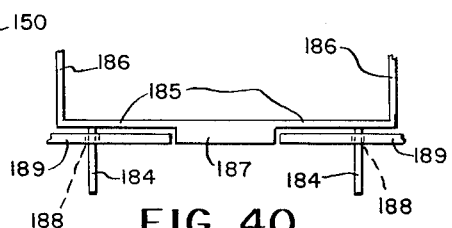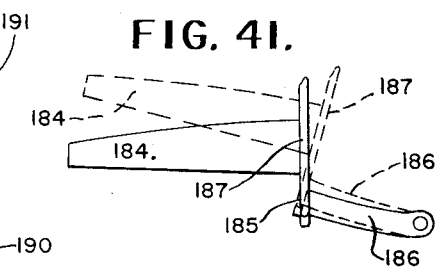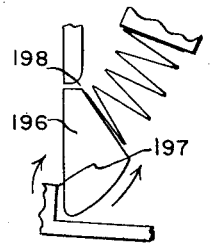

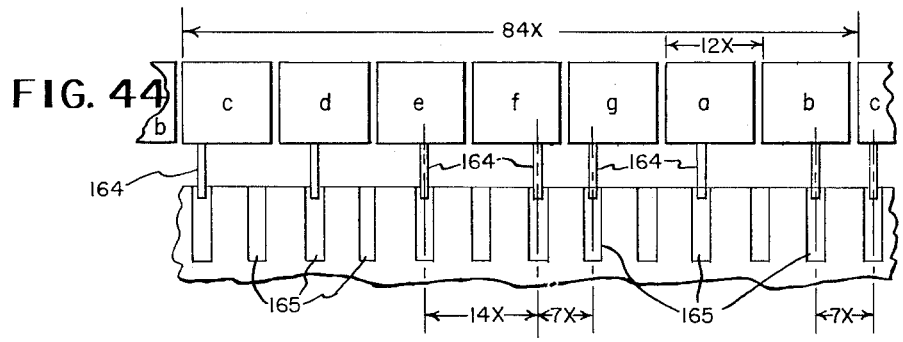
FIG. 44
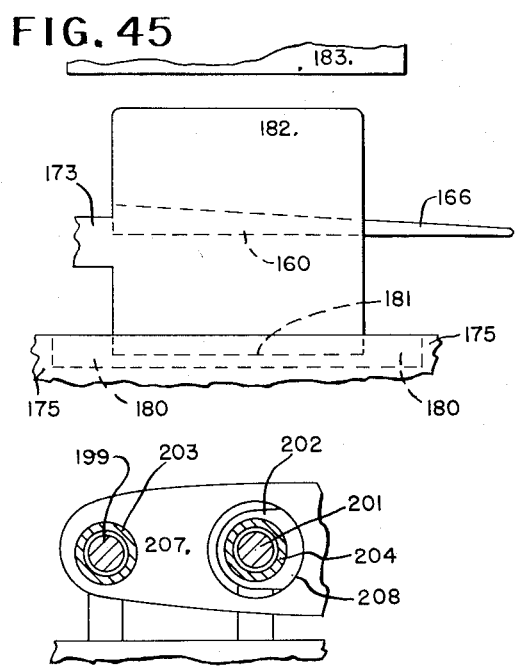
FIG. 45
FIG. 46
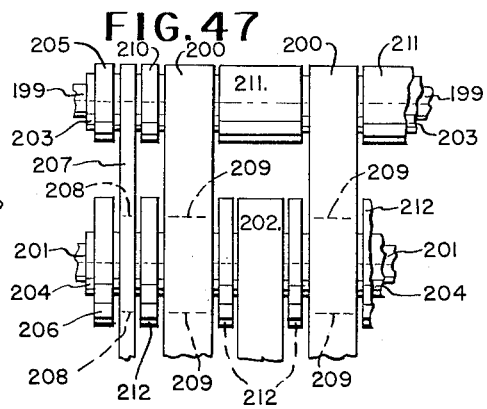
FIG. 47
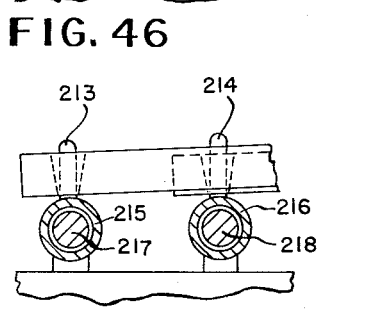
FIG. 48
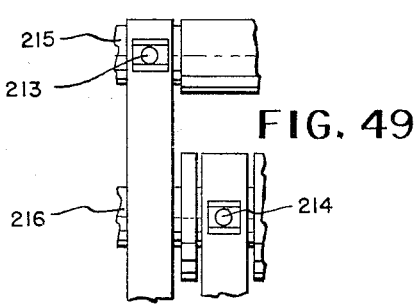
FIG. 49
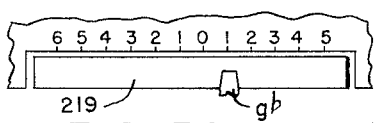
FIG. 50
INVENTOR
Harold A. Jewett.

United States Patent Office 2,996,942
Patented Aug. 22, 1961

2,996,942
KEYBOARDS AND ACCESSORIES
Harold A. Jewett, 5451 42nd St. NW., Washington, D.C.
Filed May 15, 1956, Ser. No. 585,010
8 Claims. (Cl. 84—446)

This application contains subject matter which was disclosed to some extent in applicant's applications S.N. 138,424, filed January 13, 1950, and S.N. 307,099, filed August 29, 1952, and the applications on which his U.S.P. 2,675,728 and 2,675,729 (now Reissue No. 23,956) issued; said S.N. 138,424 and 307,099, though now abandoned, having been co-pending with the applications on which his said patents issued.

A number of abbrevations and terms used herein will have the following meanings:

tr—transposing device or keyboard $\frac{oct}{7}$—⅐ octave length $\frac{oct}{12}$—1/12 octave length and/or a semitone, depending on the context Ivory or ivory cap or top—the upwardly facing finger-containing surface of a key, whether or not supplied by a lamina Levelizer—means for in effect raising the level of the tops of white ivories to that of the tops of adjacent black ivories The central object of this application is the provision of a transposing device for a keyboard type musical instrument which shall comprise a first frame that is stationary during use and a second frame which is liftable and shiftable along said first frame to a selected transpositional position in relation thereto; said second frame carrying a manual of piano type keys and locking means which, on lowering of said liftable frame from a raised position, engage complementary lock means on said first frame, to interlock said frames in a desired transpositional position, and on raising of said liftable frame become disengaged from said lock means, to permit shifting of said liftable frame to a different position in relation to said first frame; said lock means being located rearwardly of the vertical plane which includes the fronts of the white keys of said manual and advantageously rearwardly of the vertical plane which includes the fronts of the black keys thereof, and said liftable frame comprising at least one longitudinal frame member disposed in an elevated position as hereinafter designated.

Ancillary objects include the provision of a transposing device which can be installed on a keyboard type musical instrument by merely setting it down on or over the manual thereof, and de-installed merely by lifting it away from such manual, which can be centered and secured against endward displacement notwithstanding octave length variances among different makes or models of instruments on which to be used and be operable thereon despite such variances; which can be adjusted for a desired interval of transposition by merely a single, approximately instantaneous manipulation, and which, where incorporated in a keyboard type musical instrument ab initio or via reconstruction of said instrument, will entail a minimum of visible differences from ordinary such instruments.

Further objects will appear below.

Accomplishment of said objects is exemplified in the following drawings in respect to which chromatic scale tone producer installations, if not shown, are to be understood as implied; all figures as being basically diagrammatic or schematic; and all expressions such as vertical, horizontal, downward, upward, lateral, longitudinal, etc., as being relative and approximate unless otherwise evident, to be more particularly described later on:

FIG. 3 is an end elevation, partly in section, of the tr and host keyboard of FIG. 1 but with tr frame ends omitted.

FIG. 4 is a side elevation of one of the levelizers appearing in FIGS. 1 and 3.

FIG. 5 is a bottom view of the levelizer of FIG. 4.

FIG. 6 is a rear elevation, slightly varied and with certain parts omitted, of a portion of the tr of FIGS. 1–3.

FIG. 7 is a bottom view of said portion.

FIG. 8 is a bottom view, in perspective, of the rear part of the levelizer of FIG. 4.

FIG. 9 is a bottom view, in perspective, of levelizer pivot structure adapted to receive said rear part.

FIG. 10 is a bottom view, with certain parts omitted, of the structure of FIGS. 6 and 7.

FIG. 11 is a front elevational diagram of successions of ivories of a pair of host keyboards, one of which has a relatively short octave length and the other of which has a relatively long octave length, and of motionless-in-use partition structures associated therewith and adapted to serve both as centering and support agencies on either of said host keyboards.

FIG. 12 is the same as FIG. 3 except for differences pointed out below.

FIG. 13 is a plan of one of the levelizers of FIG. 12 and the guide structure in which it is pivoted.

FIG. 14 is a side elevation detail of the levelizer of FIG. 13 during assembly into its position of use.

FIG. 15 is the same as FIG. 14 except after completion of said assembly.

FIG. 16 is a section on line 16—16 of FIG. 12.

FIG. 17 is a section on line 17—17 of FIG. 12.

FIG. 18 is a side elevational detail of a form of rear key-to-key spacer useful in the tr of FIG. 12.

FIG. 19 is a side elevational detail of an alternative form of such spacer.

FIG. 20 is a plan detail of successive keys so proportioned as to obviate need for auxiliary rear spacers.

FIG. 34 is an end elevation, partly in section with certain parts omitted, of a novel in-built tr embodying certain principles of the trs of preceding figures.

FIG. 35 is a section on line 35—35 of FIG. 34 showing tr keys in a lifted and shifted posture, ready to be set and locked in a pre-selected transpositional position by lowering of a pair of tr black keys employed as lifter keys.

FIG. 36 is a plan of the bass-end structure of FIGS. 34–35, but with certain parts broken away or omitted and certain parts added.

FIG. 37 is a fragmentary detail on reduced scale, in a vertical plane just rearward of and parallel to the vertical plane which includes the rears of the black ivory caps of FIG. 34, showing a lifter key, a non-lifter key adjacent to it, and overlying structure.

FIG. 38 is the same as FIG. 37 except that the lifter key and overlying structure are in raised position.

FIG. 39 is a fragmentary sectional detail on line 39—39 of FIG. 34.

FIG. 40 is a plan diagram of a structural portion of FIG. 36 optionally varied to comprise gates normally closing the end housings into which the tr manual of FIGS. 34–36 extends, yet automatically swinging open on raising of said lifter keys.

FIG. 41 is an end elevational diagram of said structural portion.

FIG. 42 is an end elevational diagram of alternative structure adapted to yield rearwardly in response to raising of said lifter keys to clear the path for such raising.

FIG. 43 is an end elevational diagram of further alternative structure for thus yielding rearwardly.

FIG. 44 is a front elevation of a succession of white ivories of FIG. 34 carrying downwardly depending optional guide pins.

FIG. 45 is an end elevation with certain parts broken away, of collectively up-held up-stop member and transpositional locking structure appearing in FIGS. 34–36.

FIG. 46 is a side elevational detail of the rear portions of a FIG. 34 black key and the white key just beyond it, but with the fulcrum of the black key optionally placed farther rearward than that of the white.

FIG. 47 is a plan of rearward portions and adjacent structure of a series of bass-end keys fulcrumed as those of FIG. 46.

FIG. 48 is essentially the same as FIG. 46 except that its keys, instead of encircling their fulcrums, are provided with fulcrum pins which rise from the fulcrums.

FIG. 49 is a plan of the keys of FIG. 48, but with spacers added.

FIG. 50 is a front elevational diagram to be referred to below in discussing the balancing of the shiftable portions of a tr so that only a single lifter key need be grasped during the aforesaid lift-shift-locking operation.

Figure 1:
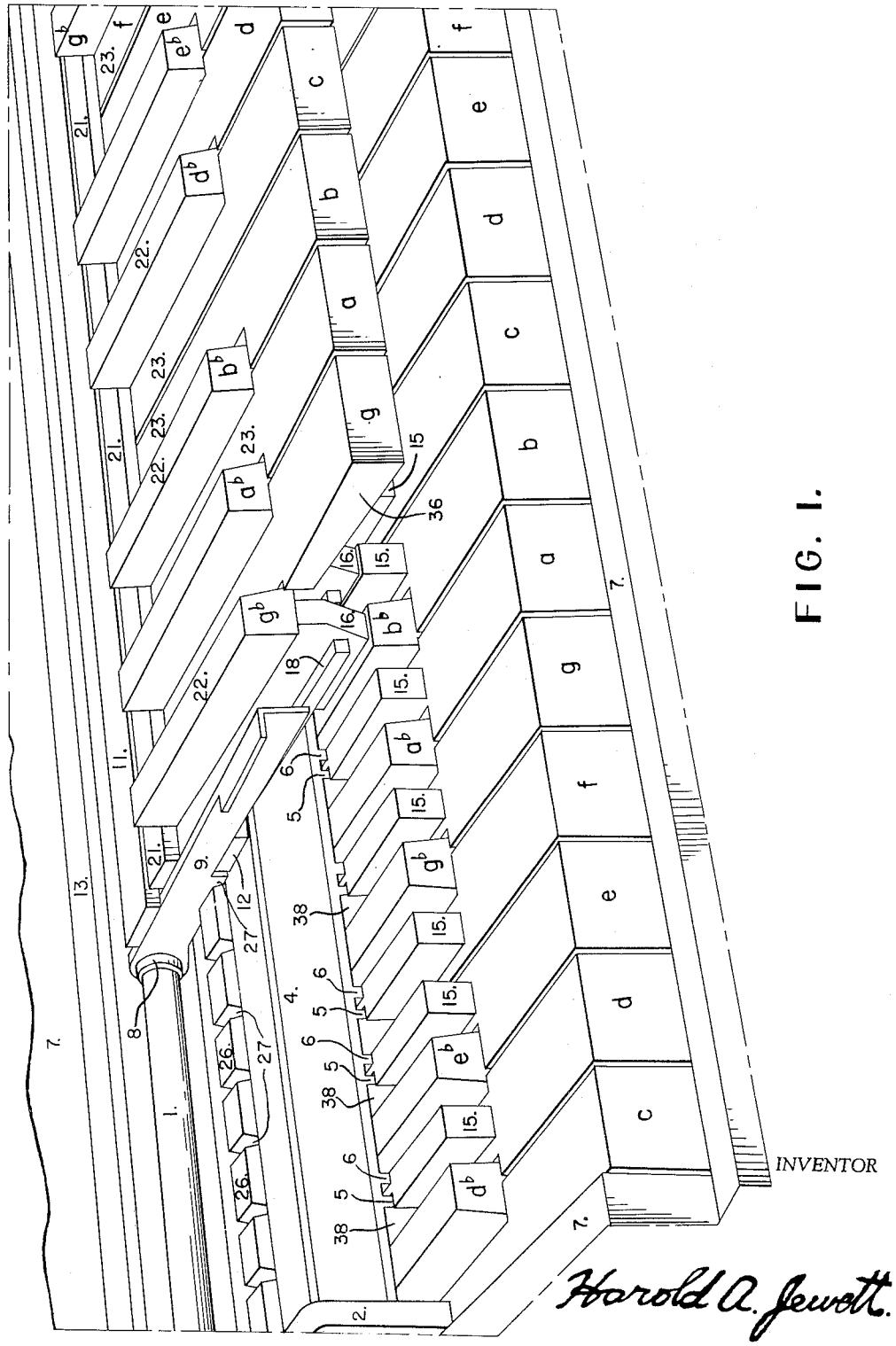
FIG. 1 is a perspective of a bass-end portion of a portable tr of the invention in position of use on a host keyboard.

Referring to the drawings in detail:

In FIGS. 1–10 round pivot rod 1 is fixed in end pieces 2 and 3 of non-shifting frame 4 whose downwardly extending partitions 5 and 6, along with said end pieces 2 and 3, seat on and are sustained by the collective hold-up force of white ivories (lettered but unnumbered) of host instrument 7. Otherwise, all portions of frame 4 clearingly overlie the host black ivories (lettered but unnumbered). Slidably sleeved on rod 1 is pivot tube 8 and united to the latter are end arms 9 and 10. Rigidly interconnecting said arms are lock bar 11 and lifter bar 12; said tube 8, bars 11 and 12, and arms 9 and 10 constituting a liftable and shiftable frame, and said arms constituting lock portions thereof, as will presently be explained. Angle bar 13, rigidly interconnecting end pieces 2 and 3, overlies tr key rears 14 (all of which are alike) and carries the centrally located tr index appearing on FIG. 2. Levelizers 15, pivoted between rear portions of partitions 5 and 6 (such partitions being shown in FIGS. 6–7 and 10 as optionally integral with each other in those instances where they overlie host white key-to-white key seams) are 7/16 inch in height and thus bring the effective level of the host whites up to that of the host blacks. Rearward of the tr white key fronts, tr key bodies 16 are all alike and each rests on either a host black ivory or a levelizer, all at a common elevation, as at 15-a (FIG. 3). It will be noted that both lock bar 11 and lifter bar 12 are above said common elevation.

$$\frac{oct}{12}$$

center-to-centering of tr key rears 14 is maintained by rear spacers 17 which encircle pivot tube 8 in the same manner as tr key rears 14 (cf. FIG. 3), the lowermost surfaces of said key rears 14 and said spacers 17 being invisible in FIG. 6 because of being submerged in hereinafter mentioned valley 24 as clearly appears in FIG. 3. Center-to-centering of frontward portions of tr key bodies 16 is maintained by spacer fingers 18 which are integral with and extend frontwardly from lock bar 11, at a sufficiently downward angle to be out of the way of a player's finger tips at all times. Optionally, rear spacers 17 and spacer fingers 18 can be united. Holes 19 and 20 (shown only in FIG. 3) serve to lessen the weight of tr key bodies 16. Tr keys' stop rail 21 rests on tr key bodies 16 just rearward of their ivory caps 22 and 23, and is collectively supported by them.

Low fulcruming of the tr keys via low placement of rod 1 and tube 8 is facilitated by valley 24 in frame 4. Relatively thick portion 25 of frame 4 serves to impart strength and to carry furrows blocks 26 which define furrows 27. The latter occur at $$\frac{oct}{12}$$

intervals and are adapted to receive tr frame end arms 9 and 10 in the manner illustrated in the case of end arm 9 in FIG. 1; the furrows 27 thus serving as complementary lock structures on the non-shifting frame, for cooperation with the lock structures (arms 9 and 10) on the shiftable frame. Tr arrow 28 (FIG. 2) is so placed that whenever it points directly to a tr index mark each of the end arms 9 and 10 will directly overlie a furrow 27, so that lowering of the arms will bring the side wall surfaces of the arms into face-to-face juxtaposition with those of the furrows, thereby interlocking the manual of tr keys and the bench of host keys at the transpositional position corresponding to the selected tr index mark.

Felt stripping 29 (FIGS. 3, 6 and 7) serves not only to deaden sound but also to limit rotatory movement of the levelizers during handling of the tr. Cut-away portions 30 in the shanks 31 of the levelizers suffice, however, to permit the slight rotatory movement of the shanks which occurs during use.

Where frame 4 is cut from a single piece of material (e.g. wood), fulcruming of levelizer pivots 32 (FIG. 8) can conveniently be accomplished by cutting cross channels 33 in partitions 5 and 6 (FIG. 9) and then placing said pivots 32 in them. The situation will then be as shown in the case of the two lowest levelizers in FIG. 10; following which, filler blocks 34 can be secured in the channels 33 to hold the pivots 32 in place, as shown in the case of the highest levelizer in FIG. 10. Reciprocation of the levelizers about their pivots 32 occurs at the eyes 35 of the levelizers (FIGS. 4 and 8).

The downward sloping of the under surface of white tr key fronts 36 (FIGS. 1 and 3) is not only for purposes of appearance but also to provide finger guard surfaces. On the other hand, minimizing of tr key weight is desirable; hence, the upward sloping of said under surface toward the rear.

Proportioning of the parts of the tr keys (best seen in FIG. 3) is determined with a view to operability not only on hosts of variant octave length but also of variant black ivory length. This accounts e.g. for the more than ½ (approximately 1⅛) inch length of down-pusher surface 37 shown on FIG. 3.

It is believed that the manner of use of the tr of FIGS. 1–10 and the functioning of its parts will be clear from the foregoing description.

Briefly summarized, however, such use involves lifting the tr from its carrying case (not shown) wherein appropriately placed partitions and wall surfaces can guard the tr and its moving parts during transportation; placement of the tr on a host keyboard with the end pieces 2 and 3 resting on c ivories whose distance apart approximates that separating said end pieces; lifting of said shiftable frame, e.g. by grasping one or both of the end arms 9 and 10 (e.g. until tr ivory rears 14 contact angle bar 13); sliding of pivot tube 8 along pivot rod 1 until the tr arrow 28 points to the index mark corresponding to the degree of transposition desired; and lowering of said shiftable frame so that the end arms 9 and 10 will seat in the particular furrows that will then respectively underlie them. In the situation illustrated in FIGS. 1–2 e.g. that will result in $$\frac{4 \text{ octs}}{12}$$

transposition upward, as indicated by the fact that the terminal g-flat tr keys in the figures are resting on host b-flat keys.

Should the user wish to effect the transpositional adjustment single-handedly, he need grasp only one end arm or only one of the tr keys. In the latter case, as the tr key is raised (cf. e.g. FIG. 50 and text descriptive thereof) it liftingly engages the under surface of the lock bar, thereby raising the latter; after which the shiftlock manipulation is the same via the tr key as if done via the end arms.

Centering of the tr will have been effected by a loose but close fit between the partitions 5 and 6 occupying the space between central e-flat and g-flat host keeps and the juxtaposed walls of said keys, with substantial spacing between such partitions and corresponding host black key walls at outlying loci. Such substantial spacing is exemplified by relatively wide spaces 38 on FIG. 1, and provides for operability on hosts of variant octave lengths.

In FIG. 11, which is addressed to the matter of centering, portion A–I is a front elevational reduced scale diagram of a bass-end succession of ivories of an ordinary 61-note manual having, let us assume, the shortest octave length of any make of host instrument under contemplation; A–II is the same except that its succession of ivories is an octave nearer the center of the manual than that of A–I; and A–III again is the same, except that in it the succession of ivories is at the middle of the manual. B–I, B–II and B–III are respectively identical with A–I, A–II and A–III, except that their ivories belong to a manual having the longest octave length of any make of host instrument under contemplation. Said octave lengths thus represent the extremes against which provision is to be made, in determining the placement of partitions corresponding to 5 and 6 of, say, FIG. 6. The long dash lines on FIG. 11 are dropped perpendicularly from the side wall bottoms of the black ivory caps in row A, and the short dash lines from those in row B (none of the latter lines appearing in column III, however, since its ivories are central and their black key-to-black key spaces consequently are substantially equal).

Now, centering of a portable keyboard on either of the manuals of FIG. 11 can be effected exclusively by partition structure 39 (C–III and D–III) whose overall width is such as to fit snugly but freely between middle e-flat and middle g-flat on either manual A or manual B. It might have been thought that the usual amount of lateral play of piano and organ key levers in relation to their guide pins would operate to make such centering inadequate, but this has not been found to be so. In other words, even though a slight endward displacement of one of the portable assemblies of the invention can be produced by exertion of an endward force against it, on account of said lateral play, no inoperativeness has been found to result therefrom, when outlying partition structures occupying black key-to-black key spaces have been made sufficiently narrow, and levelizers pivoted in them spaced an ample distance from e–f or b–c seams underlying such structures, to avoid unwanted overlap of such levelizers onto adjacent such e or f, or b or c ivories.

To determine the requisite narrowness in this regard, it is only necessary to make sure that none of the partition structures in question is wide enough to be intersected by any of the FIG. 11 dash lines, whether long or short. Row C on FIG. 11 shows such structures which, while meeting this test, are of gradually diminishing width outwardly from the center (C–III). This makes possible a maximum of width at any particular locus, and may be a preferred expedient when a frame such as 4 of FIG. 1 is cut from wood or analogous material. In contrast, row D on FIG. 11 shows such structures where all except the centering one itself (39 in D–III) are of uniform width. This type may be preferred where the structures are fabricated separately and then affixed to the frames.

To insure against the aforesaid overlap of levelizers onto neighboring ivories, notwithstanding the cumulative effect of octave length variances among hosts outwardly along the manual, the levelizer channels 40 in row C and 41 in row D can be spaced apart as far as possible, consistently with adequate width or strength of walls 42 (row C) and 43 (row D). And in any case, taking into account the aforesaid lateral play of key levers in relation to their guide pins, as well as the slight lateral play which will inherently occur between the levelizers and the walls of their channels, it is advisable to provide at least ⅛" (better ⁵⁄₃₂" and still better ³⁄₁₆" or more) space between successive levelizers in outlying loci along their frame. Or, put in terms of the width of a levelizer, it may be said that the space between levelizers in terminal octaves (cf. e.g. the levilizers 15 resting on low e and low f in FIG. 1) advantageously can be at least ⅓ (better ½, and still better ⅔) the levelizer width.

In determining the octave length to adopt in constructing any of the portable assemblies of the invention, one midway between that represented in row A and that represented in row B of FIG. 11 can be selected, and all $$\frac{\text{oct}}{12}$$

center-to-centering in the construction of such assemblies be on the basis of it.

The tr of FIGS. 12–24 will be most readily understood, it is believed, by first comparing its parts with those of the tr of FIGS. 1–10. Thus, pivot rod 44 is like 1 though at a lower level; pivot tube 44a is like 8; non-shifting frame 45 corresponds generally to 4; and shiftable frame bar 46 serves the purposes not only of lock bar 11 but also of keys lifter bar 12 and stop rail 21; the latter, since it is sustained by the collective hold-up force of tr key bodies 47 and functions as a tr keys' lifter bar by engaging tr key hooks 48 when tr frame treble end arm 49 and a corresponding bass end arm (understood) to which the ends of bar 46 are united, are raised; the positions of the parts before and after such raising being respectively depicted in FIGS. 21–22 and FIGS. 23–24. As best seen in FIGS. 12 and 16, the tr key hooks 48 overlie bar 46 a sufficient distance not to impinge on it during down travel of the tr keys with which they respectively are integral, and underlie index bar 50 (corresponding to 13) a sufficient distance to insure adequate elevation of the tr key downpusher surfaces 51 (similar to 37) when, upon raising of said end arms, the bench of tr keys is shifted to a desired transpositional position. Spacer fingers 52 being integral with bar 46, correspond to 18. Holes 53 and 54 (FIG. 12) are analogous to 19 and 20.

Levelizers 55 (corresponding to 15) have rear portions 56 terminating in tails 57 adapted to be fed freely through pivot eyes 58 in levelizer channel pieces 59 in manner apparent from FIG. 14, so that in position of use (FIGS. 15 and 12) the levelizers will be locked in place by said tails, yet have ample freedom for reciprocation.

Longitudinal tie member 60, interconnecting channel pieces 59, has relatively wide and deep furrows 61 whose walls 62 are engaged by the tr frame end arms when the latter are lowered after shifting of the bench of tr keys until the tr arrow (assumed to be on the upper face of keys lifter bar 46) points to a desired tr index mark. Said end arms do not seat in the bottoms of the furrows however (as do 9 and 10 in furrows 27), but only reach part way down. This is because collectively upheld bar 46, to which the instant end arms are united, sustains them, rather than vice versa (as in the tr of FIGS. 1–10).

During the aforesaid shifting, tr key bodies 47 are at a level high enough to clear walls 62, but in position of use they are not. In other words, on lowering of the tr frame end arms, said key bodies (which optionally could be bevelled, or else the tops of said walls be bevelled, to facilitate feeding of the bodies into the spaces between the walls) occupy positions best seen in FIG. 16. And during down travel of the tr keys in use, said walls consequently serve as guides or stabilization aids for them.

Treble end cushion 63 (FIG. 12) and an analogous one (understood) at the base end of frame 45, serve to protect host casing 64 from contact with the tr.

Rear spacers such as 17 can be used for maintaining $$\frac{oct}{12}$$

center-to centering of the tr keys along pivot tube 44a. Alternative structures for this purpose are shown in FIGS. 18–20 however.

Spacer 65 of FIG. 18 is integral with spacer finger 52 and is in union with keys lifter bar 46. Also, it has an eye 66 for encircling pivot tube 44a. By giving the upper portions 67 of spacers 65 substantial vertical dimension (and adapting neighboring parts accordingly) their co-action with walls 62 as tr key stabilization aids will be enhanced.

Spacer 68 of FIG. 19 is merely an ordinary resilient split ring or snap washer adapted to be forced directly into place on structure such as tube 44a.

Spacers 69 of FIG. 20 are rear portions of the tr key bodies, each being given a width of almost an $$\frac{oct}{12}$$

so as to eliminate need for separate or auxiliary spacers along the tube.

Front portions 70 of the white tr keys derive their contour not only from considerations already mentioned in regard to white tr key fronts 36 of the tr of FIGS. 1–10, but also from the need for operability on host manuals of variant white ivory lengths, e.g. to insure against impingement on fronts of host white ivories of over-average length, during down motion.

Figure 25:
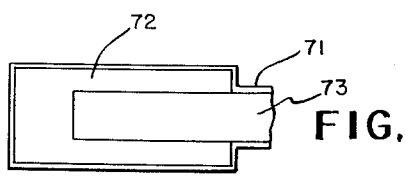
FIG. 25 is a bottom view detail of the front portion of a white key of the tr of FIGS. 1–3, but depicts principles of construction useful in other forms of trs, e.g. that of FIG. 12.

Lightness of weight of the tr keys, especially their frontward portions, can be achieved in a number of ways. E.g. the keys can be made hollow, or their bulk can largely be comprised of balsa wood or equivalent material. Thus, in FIG. 25 tr ivory cap 71 is affixed to a body 72 of balsa wood which is carried by a shank 73 of plywood. Rigidity and strength is imparted by both the ivory cap and the plywood.

It will be understood that whereas the center-to-centering of the bodies of the tr keys of the invention is uniformly at $$\frac{oct}{12}$$

intervals, the placement of their ivory caps is dictated by the geometry of the upper face of the conventional manual. This means that the ivory caps will protrude in varying degrees beyond the key bodies on which they are affixed. For this reason, structures directly beneath such caps must not be less than the ivory drop's distance below them. This is exemplified in the case of spacer fingers 52 (cf. e.g. FIG. 17) whose distance below tr ivory caps 74 and 75 has thus been gauged. (Cf. also the height of tr ivory caps 22 and 23 above spacer fingers 18 in FIG. 3.)

It is to be noted in regard to FIG. 17, that for clarity section lines have been omitted from all structures except the tr key bodies 47 and the spacer fingers 52.

Figure 27:
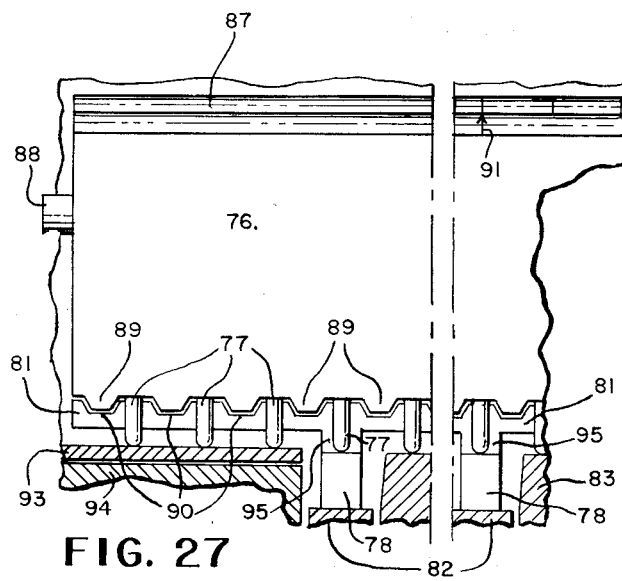
FIG. 27 is a front elevation of a terminal portion of the tr of FIG. 26, which portion overhangs a host end block; certain parts being in section and others broken away.
Figure 26:
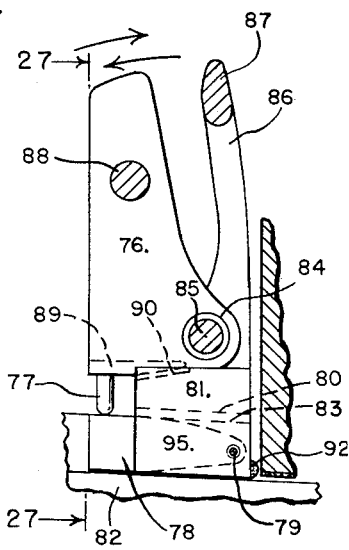
FIG. 26 is an end elevation, partly in section and with certain prior art portions, broken away, of an "Organo" tr in position of use.

In FIGS. 26–27 housing 76 corresponds to "housing 18" (also "assembly 84") and tone production accessories thereto, of U.S.P. 2,562,670, while pins 77 correspond to the "downwardly projecting portion 31" of said patent. As set forth in the patent, said portions "31" are continually spring pressed against the ivories on which they rest so that, on depression of an ivory by finger pressure during use, the pin moves downwardly and in the process closes a tone actuator switch; de-activation of the switch occurring during reverse movement consequent on release of said pressure. While reference is made in the patent to the particular pins and switches of U.S.P. 2,484,977, the exact form which they may take is not critical to the instant invention, so long as they function in the general manner described. E.g. the housing 76 and pins 77 of instant FIGS. 26–27 can be thought of as respectively functioning similarly to switch assembly "10" and "switch fingers 27" of U.S.P. 2,505,608, except only that the electrical connections shown in the latter are for color rather than tone production.

Levelizers 78 in FIGS. 26–27 are pivoted at 79 in levelizer channels 80 in non-shifting frame 81 so as to bring the effective level of host white ivories 82 up to that of host black ivories 83. Cylindrical sleeve 84 in housing 76 encircles round rod 85 whose ends (not shown) are fixed in non-shifting frame 81. Integral with the latter are upright arms 86 interconnected by tr index bar 87.

Transposition is achieved by grasping handles 88 on the ends of housing 76 so as to swing the latter rearward (cf. upper arrow in FIG. 26) and thereby disengage $$\frac{oct}{12}$$

cogs 89 from $$\frac{oct}{12}$$

furrows 90; whereupon housing 76 is slid along rod 85 until tr arrow 91 (FIG. 27) points to the desired tr index mark, housing 76 then being swung forward until the cogs 89 seat in respectively underlying furrows 90.

Treble and cushion 92 corresponds to 63 of FIG. 12.

Terminal pins 77 are maintained inactive by shims such as 93 inserted in the space between them and host end block 94. Otherwise, the sole support for the tr of FIGS. 26–27 is derived from the collective hold-up force of host white ivories 82 on which walls 95 (containing the levelizer channels 80) rest.

It will be noted that the tr in FIG. 27 is illustratively set for the maximum transposition trebleward of which it is capable; shifting of housing 76 to the left as far as possible having resulted in placing over the terminal host ivory in the figure a pin 77 which actuates a higher tone than would any of those appearing to its left (i.e. resting on shim 93).

Figure 28:
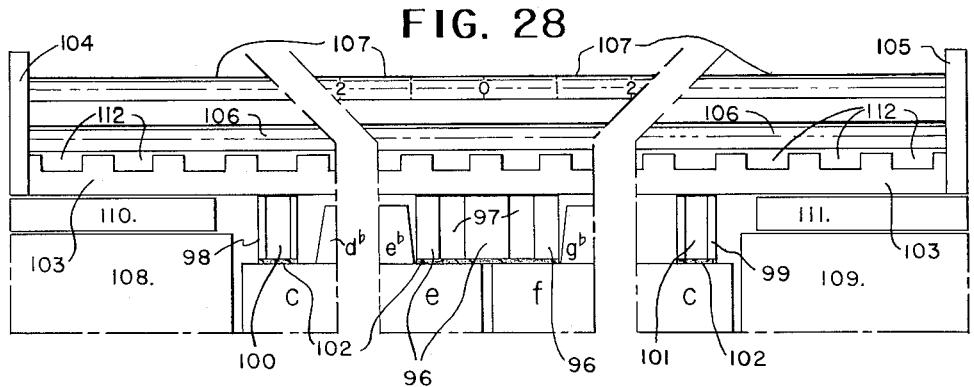
FIG. 28 is a front elevation of the non-shiftable frame portions of a tr which derives its primary support from host end blocks but is centered in accordance with principles discussed below in connection with FIG. 11.

In FIG. 28 centering structure 96, corresponding to 39 of FIG. 11, is slotted to provide channels 97 for levelizers (not shown), while outlying partitions 98 and 99, respectively slotted to provide levelizer channels 100 and 101, are dimensioned and disposed in accordance with the principles discussed in connection with FIG. 11.

Felt stripping 102 corresponds to 29 (FIGS. 3, 6 and 7).

Non-shiftable frame structure 103 (to which centering structure 96 and partitions 98 and 99 are rigidly united and which itself is rigidly united to end pieces 104 and 105, the latter being interconnected by rod 106 and index bar 107) overhangs host end blocks 108 and 109, and receives support from the latter via shims 110 and 111. Such support is supplementary to that imparted by host white ivories (lettered but unnumbered) to parts 96, 98 and 99. If the latter did not reach down sufficiently for felt stripping 102 to contact said ivories however, the support from the end blocks could be the sole support of frame 103 and any shiftable assembly carried by it, without sacrifice of the functioning of partition structure 96 as a centering agency. On this score it may be observed too, that the same would be true if the centering were effected by a thin spacer depending into the space between rearward portions of a white key and a key adjacent to it.

Shims such as 110 and 111 could be supplied in the FIG. 27 structure, if needed, by placing them in the spaces directly rearward of shim 93 and its counterpart (understood) at the treble end, to thereby contribute support to housing 76 of said figure.

Furrows 112 correspond to 27, 61 and 90 (more particularly 61 because of their width) but, like rod 106 and index bar 107 which respectively correspond to 1 and 13, 44 and 50, and 85 and 87, are called into play only in co-action with a shiftable tr assembly (not shown in FIG. 28) such as previously described.

Figures 29, 30:
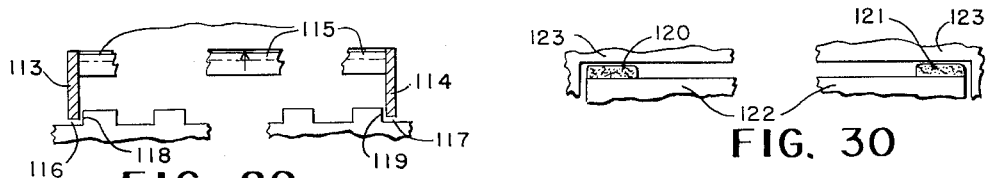
FIG. 29 is a fragmentary front elevation, partly in section, of the shiftable frame ends' locking means as contemplated for the tr of FIGS. 12–24.
FIG. 30 is a fragmentary plan of a host whose casing is contacted solely by small cushions affixed to end loci of non-shiftable frame structure of a portable assembly.

In FIG. 29 end arms 113 and 114 (similar to 49 of FIGS. 21 and 23), interconnected by tr arrow bar 115 (corresponding to keys lifter bar 46 of said figures), are shown in position of rest. Their failure to reach bottom in furrows 116 and 117 is due to the fact that bar 115 is sustained at too high a level by the tr key bodies (understood) on which it rests. Yet the locking function of the arms is served by their engagement, while thus at rest, with walls 118 and 119 of said furrows.

In FIG. 30 cushions 120 and 121 (similar to 63 and 92) are affixed to non-shiftable frame 122 to protect host casing 123 from contact with other portions of 122 or any assembly comprising it.

Figure 31:
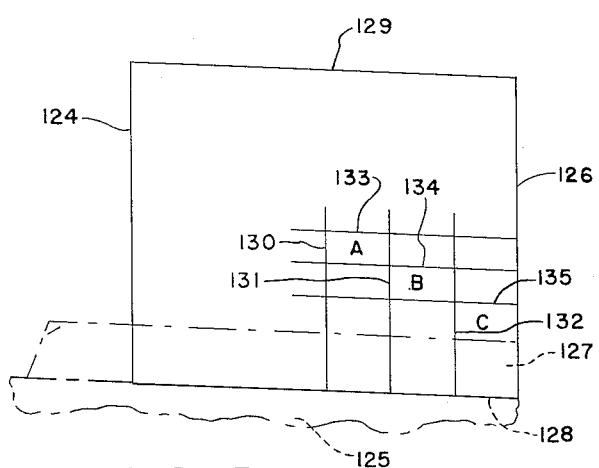
FIG. 31 is an end elevational diagram to be referred to below in connection with preferred zones for locating the center of gravity of portable assemblies.

In FIG. 31 line 124 represents the vertical plane, parallel to the axis of host manual 125, which includes the front most portion of any frame structure comprised in a portable assembly having a chromatic scale bench of tone actuators, where said assembly is sustained via loose contact with upper surfaces of host ivories or end blocks; line 126 represents the vertical plane, also parallel to said axis, which includes the rears of the host black ivories 127 at the level of the adjacent portions of the upper surfaces 128 of the host white ivories; and line 129 represents the plane which is parallel to said upper surfaces 128 and includes the topmost portion of any frame structure comprised in said portable assembly. Lines 130, 131 and 132 represent planes parallel to 124 and 126, and lines 133, 134 and 135 planes parallel to 128 and 129.

Upward displacement of a portable assembly, due e.g. to prolonged pressure on the front of one of its white ivories, can be adequately countered by giving the assembly sufficient weight (say, at least 1½, better 1¾, 2 or even more ounces per each host white ivory which it overlies) and locating its center of gravity sufficiently rearwardly and downwardly, as presently to be particularized. And said frontward displacement in general can be adequately countered too, by giving sufficient length (e.g. four or more times its octave length) to the framework of the assembly.

In respect to the countering of upward displacement it should be added that deformation-resistant longitudinal structure such as angle bar 13 of FIG. 3, closely overlying the rears of tr keys fulcrumed as on pivot tube 8 thereof, restricts to a negligible degree any tendency toward upward bowing in use, of a pivot rod such as 1 in said figure. Also, fabrication of such parts as said bar, tube and rod, particularly the latter, of heavy material—e.g. at least partly of one of the metals known as "heavy metals" (specific gravity greater than four)—helps serve this purpose, besides contributing to general stability.

Turning to FIG. 31, and assuming that at least a portion of frame structure of any chromatic scale portable assembly placed on its manual 125 seats on host structure directly underlying the line which is parallel to the axis of the manual and includes the center of gravity of the assembly, line 130 is midway between lines 124 and 126, lines 131 and 132 are equidistant from each other and from 130 and 126 respectively, line 133 is midway between line 129 and surfaces 128, and lines 134 and 135 are respectively $\frac{1}{10}$ and $\frac{2}{10}$ the length of 124 or 126 (they being equal) below 133.

Advantageously the center of gravity of the portable assembly will be rearward of line 130, better line 131 or still better line 132. And it also will underlie line 133, better line 134 or still better line 135. Moreover, it advantageously can be within parallelogram A, better parallelogram B or still better parallelogram C.

Weighting or weight distribution can be aided by embedding lead or the like in rearwardly and downwardly located structure such as partitions 5 and 6 of the tr of FIGS. 1–10, or rears 14 of the tr keys thereof, or rear spacers 17 adjacent said rears.

It may be added, in regard to locating the center of gravity rearward of lines 130, 131 or 132, that where the support of the assembly is derived from collective up-force of host keys, said up-force becomes greater in amount as the distance from the fulcrums of the keys lessens, thus permitting a greater overall weight for the assembly with consequent enhancement of its stability.

It will be borne in mind, of course, that the loci and lengths of the numbered lines on FIG. 31 may vary considerably, depending on the dimensions and proportions of the particular assemblies. E.g. line 129 might be shorter than line 124, and parallelograms A, B and C of less width than height. Not so, however, where the assemblies comprise chromatic scale benches of tr ivories for operating host keys and thus involve the generation and withstanding of innumerable leverage forces not encountered in other types of the portable assemblies.

Figure 32:
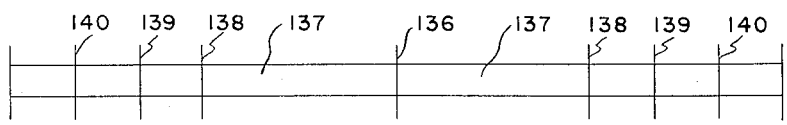
FIG. 32 is a plan diagram of a tr keys' upstop bar intended to rest on and be supported by the tr keys.

In FIG. 32 line 136 denotes the location of the center of gravity of upstop bar 137 which, like rail 21 of FIGS. 1 and 3 or bar 46 of FIGS. 12, 16 and 21–24, not only serves as a stop rail for tr keys but is sustained by them. In the case of a tr key located at 136 the full weight of bar 137 acts to oppose excessive up-travel of the key during its return motion. But in the case of tr keys located endwardly along the bar a progressively smaller fraction of such weight thus acts. Consequently it is advantageous to load the bar with extra weight in its outlying portions. This may be visualized in relation to lines 138 which respectively bisect the left and right halves of bar 136, and lines 139 and 140 which trisect the respective terminal quarters of the bar. I.e., it is advantageous to locate the center of gravity of each half of the bar 136 endwardly of lines 138, better 139, and still better 140; e.g. by giving end arms such as 49 in FIGS. 21, 23 appropriate weight.

Figure 33:
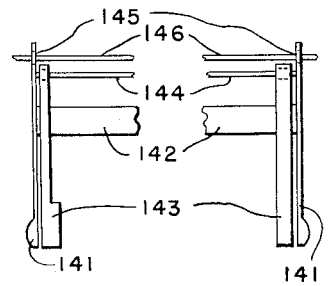
FIG. 33 is a fragmentary plan of a non-preferred form of the lift-shift-lock structure variously exemplified in the trs of FIGS. 1–10; 12–24; 26–27; and 34–49.

In FIG. 33 analogous end arms 141 (which similarly can be given suitable weight) are in union with bar 142 which serves as a stop rail for tr keys 143; the latter being fulcrumed on rod 144 which is united to the arms to form, with them and bar 142, a rigid rectangular rack. Eyes 145 in the rear ends of arms 141 encircle fixed rod 146 so as to be slidable along it. The unitary lift-shift-lock manipulation of the invention can therefore be effected by slightly raising arms 141 (if desired, by manipulating only one of them), sliding the rack along rod 146, and setting the arms down in selected transpositional position.

One reason why the structure of FIG. 33 is a non-preferred embodiment of the invention is that its tr keys are fulcrumed needlessly forward of rod 146, as contrasted with the situation in FIG. 12 e.g. where the functions of rod 144 and eyes 145 are combinedly served by pivot tube 44a which is sleeved onto pivot rod 44 (the FIG. 12 analogue of rod 146).

In the tr of FIGS. 34–45, wherein such needlessly forward fulcrumming is obviated in similar fashion, pivot rod 147 is fixed in rearward casing structure 148 and tr white keys 149 and black keys 150 are fulcrumed on pivot tube 151. The tr key body downpusher portions 152 each rest on under levers 153 at a common elevation, as at 153–a, FIG. 34; said under levers 153 thus constituting levelizing means for said keys 149, 150; being of uniform level and width (e.g. via conversion of a bench of conventional piano key levers) and being pivoted on fixed fulcrum rail 154. Opening 155 in bass-end housing 156 (which is roofed over by end block 157) permits shifting of bass-end tr keys therethrough. A corresponding opening and associated parts is contemplated for the treble end of the tr. Tr frame end arms such as 158, united with or rotatably mounted on tube 151 and confined by end washers such as 159, form, together with tr keys' lifter bar 160 (which rests on the bottoms 161 of their windows 162) a rectangular rack which is slidable along rod 147. Front guide pins 163 not only serve to keep all the under levers 153 in co-alinement but also may rise to a sufficient height to do so for the tr keys too, as is apparent from FIG. 34. Optionally further guide pins 164 may depend from the fronts of tr white keys 149 at suitable intervals as shown in FIG. 44, to reciprocate in $$\frac{\text{oct}}{12}$$

guide sleeves 165.

Figure 2:
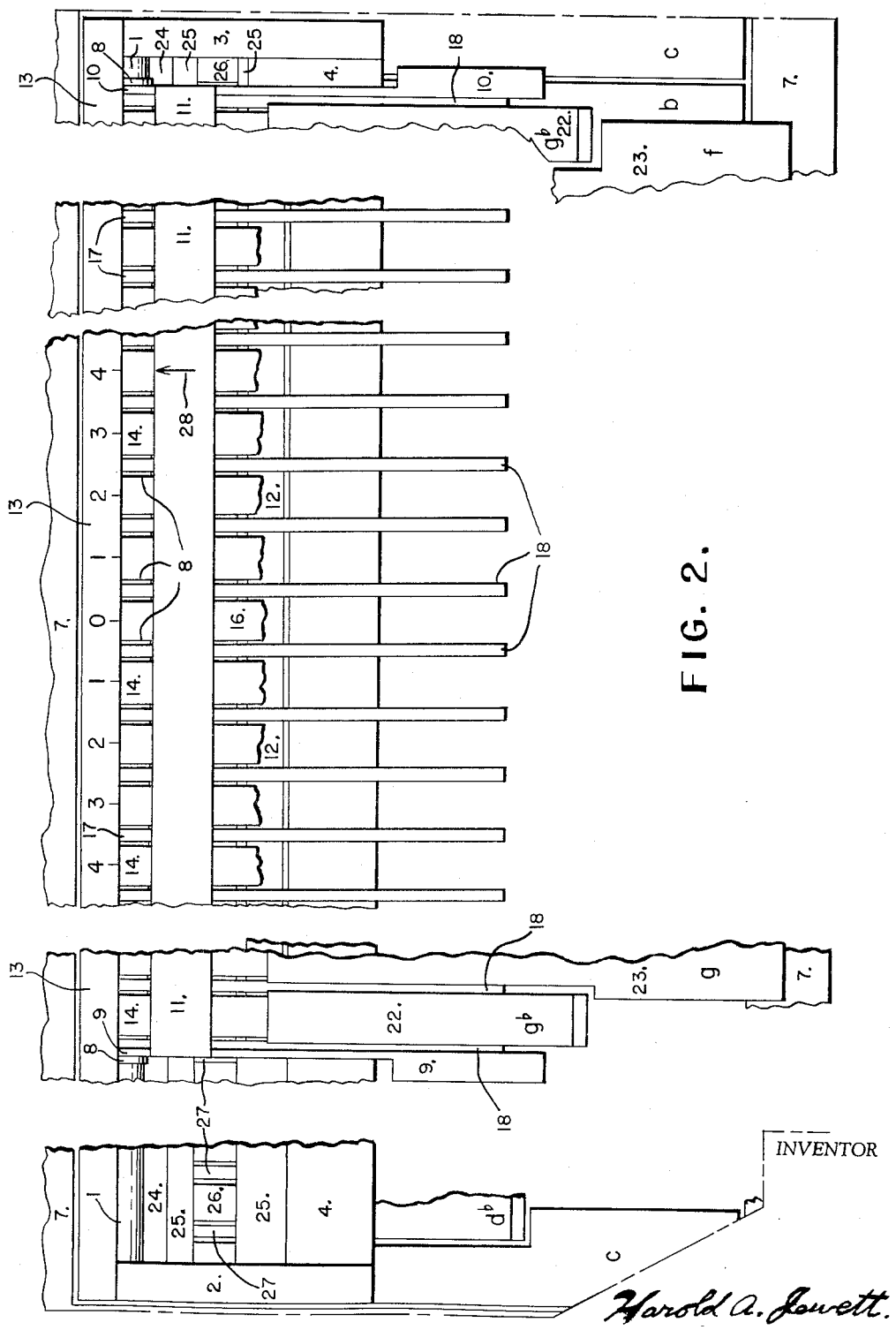
FIG. 2 is a plan of the tr and host keyboard of FIG. 1 but with certain parts omitted.
Figure 21:
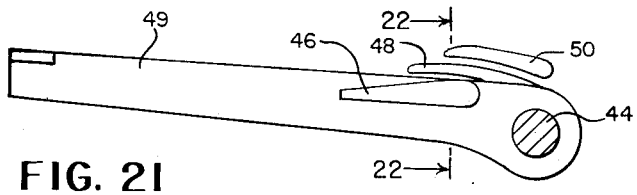
FIG. 21 is an end elevation of the tr of FIG. 12 but with frame ends added and host keyboard omitted.
Figure 22:
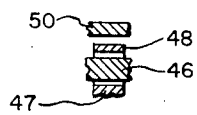
FIG. 22 is a fragmentary section on line 22—22 of FIG. 21.
Figure 23:
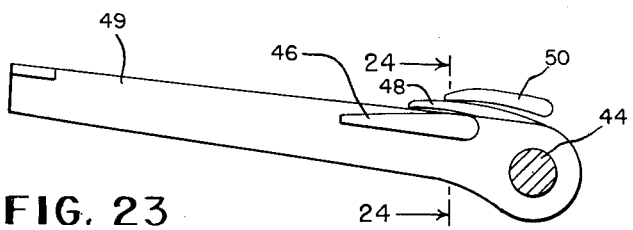
FIG. 23 is the same as FIG. 21 except that the frame ends have been swung upward, as by lifting at their fronts, preparatory to shifting of the frame to a desired transpositional position.
Figure 24:
FIG. 24 is a fragmentary section on line 24—24 of FIG. 23 and is the same as FIG. 22 except after said lifting.

It will be noted that said pivot rod 147 corresponds to pivot rod 1 of FIGS. 1–3, and that each of said rods serves as an anchor means for the rears of the transposer keys; also that the function of said guide pins 163 in keeping under levers 153 in co-alinement corresponds to that of partitions 5 and 6 of FIGS. 1, 6–7 and 10 in keeping levelizers 15 (they also being "under levers") in co-alinement.

Since there are seven white key fronts and twelve tr key bodies in an octave, and since the lowest multiple of 7 and 12 is 84, the length of one 84th of an octave in FIG. 44 is taken as $x$. Consequently the center-to-centering of the $$\frac{\text{oct}}{12}$$

sleeves is shown as $7x$ and that of the pins as $14x$, except that twice during the octave the latter is only $7x$. By modified reversal of parts the sleeves could take the form of conventional guide sleeves in the white key fronts. Not only would this lessen the weight of the keys, but it also would advantageously place the pin-sleeve rub areas higher up—i.e. inside the keys rather than below them. But it would require twelve pins per octave instead of seven.

Co-alinement of the tr keys is aided by front spacer fingers 166 projecting from bar 160, as well as by rear spacers such as 167 (FIG. 36).

It will be apparent that lifting of any of the tr keys will raise bar 160 and that if the bar be raised high enough to pass through the position shown in dash lines on FIG. 34 it in turn will raise the rest of the tr keys; whereupon the whole bench may be shifted either bassward or trebleward as desired. For doing such lifting however, it may be desired (e.g. for purposes of good balance) to make sure that only a certain one or group of the tr keys will be used. To this end, each of the tr keys except those to be thus made available as lifter keys may be formed with a hump 168, underlying stop rail 169. The latter rail rigidly depends from rear casing structure (not shown) as at 170 (FIG. 36) and permits only the lifter key or keys (i.e. those lacking the hump) to rise enough to lift bar 160 to and beyond its said dash-line position. Sufficient leeway is provided however, for the full bench of tr keys to be raised enough for their portions 152 to clear pins 163 during shifting.

Because of the exaggerated upward (and rearward) swing of a key when used as a lifter for the other keys, rather than merely for unlocking, it is necessary to momentarily eliminate structure such as name board 171 from the arcuate path of the rear of the key's ivory, e.g. as at locus 172. This is done in the instant case by affixing the name board to end arms 173 which have downward projections 174 to normally seat on housing floors 175 and are rotatably fulcrummed on rod 147 via eyes such as 176 (FIG. 36). Supposing the lifter keys are the e-flat next above middle g-flat (as in FIG. 35) and the b-flat (not shown) next below it, the initial upward movement of the lifter keys will raise, in evenly balanced manner, not only bar 160 but also name board 171, via contact with the latter's bottom portion 177, so that said portion will swing upwardly (and rearwardly). Provision for this is made via the seam 178 between the top of the name board and superjacent casing structure 179.

In housing floors 175

$$\frac{\text{oct}}{12}$$

furrows 180, adapted to receive bottom portions 181 of lock pieces 182 when the lifter keys are released; said lock pieces 182 being integral with both bar 160 and, respectively, end arms 173, and functioning in the manner of arms 113 and 114 of FIG. 29. In FIG. 34 the lock pieces 182 are shown as optionally of greater upward dimension than in FIG. 45.

Excessive raising of the tr keys is precluded by fixed ceiling structure 183 fairly closely overlying the tops of said pieces 182.

It may be desired, e.g. for purpose of appearance or as finger guards, to provide closures for openings 155. In such case the closures may take any desired form, so long as they are susceptible of being moved or removed enough to permit shifting of the tr ensemble through said openings. Thus, in FIGS. 40–41 are shown gates 184 integrally united with frame 185 whose end members 186 correspond to 173 of FIGS. 34 and 36, and which carries name board 187; the latter being similar to 171 of said figures except shorter. When, in response e.g. to lifting by a lifter key, the name board 187 and gates 184 assume the position indicated by dash lines on FIG. 41, the gates (having swung upwardly in slots 188 in casing structure 189) offer no obstacle to shifting of the tr keys. But when such shifting has been completed, and the tr ensemble has become locked in position, lowering of the gates (due to down motion of the lifter keys) will have caused them to re-close the openings 155.

In FIG. 36 optional gate 190 is integrally united with name board 171 so as to be swung upwardly by it in the same manner as gates 184 of FIGS. 40–41 are by name board 187. At rest however, gate 190 closely overlies the tr ivory adjacent opening 155 or, in case of extreme shifting of bar 160 to the right, the ledge 191. And the situation is the same, in regard to the ledge 192 and the treble end gate (understood), when bar 160 is in its extreme leftward position. It will be apparent too, that the gates (being sufficiently thin) will in each transpositional position closely flank one or another of the tr black keys 150, except when overlying a seam between tr *e*-to-*f* or *b*-to-*c* ivories.

Where end closures are either omitted or are not operatively responsive to lifter keys, name board structures such as depicted in FIGS. 42–43 may be used to provide the above described yieldability.

In FIG. 42 the behavior of name board 193 is believed manifest from the drawing (locus 194 and seam 195 being respectively analogous to locus 172 and seam 173 of FIG. 34). And the same is true in respect of name board 196 in FIG. 43 (locus 197 and seam 198 being respectively analogous to locus 172 and seam 178 of FIG. 34).

In FIGS. 46–47 fixed pivot rod 199 (for the tr black keys 200) is placed any desired amount rearward of pivot rod 201 (for the tr white keys 202). The tr blacks are fulcrumed on pivot tube 203 and the tr whites on pivot tube 204; said tubes being respectively slidably sleeved on said rods 199 and 201. End washers 205 and 206, respectively fixed on said tubes, confine end arm 207 against leftward displacement. Rotatory reciprocation of said end arm 207 notwithstanding its penetration by tube 204 is made possible by eye 208 in said arm. And eyes 209 in black keys 200 function similarly in enabling the latter to reciprocate notwithstanding their penetration by said tube 204. The functioning of spacers 210, 211 and 212 is believed clear from FIG. 47.

FIGS. 48 and 49 likewise need no elaboration, it is believed, unless to stress that fulcrum pins 213 and 214 are integral with pivot tubes 215 and 216, and that use of any suitable means (not shown) is contemplated for precluding rotative motion of said tubes about their respective pivot rods 217 and 218.

FIG. 50 may be thought of as a front view detail showing a name board 219 similar to 187 of FIG. 40 but shorter. In place of a tr arrow on the tr ensemble (not shown) associated with it, the middle *e*-to-*f* seam of the tr manual of said ensemble is intended to be used. Thus, when said seam is directly in line with the zero mark on the tr index appearing in the figure, the amount of transposition will be zero. And to shift the tr ensemble either way the use of only a single lifter key is intended, it being the middle key of the tr manual and here shown as middle *g*-flat. Assuming precision fabrication of the parts, the center of gravity of the tr ensemble can directly underlie the axis of said *g*-flat, so that lifting of the latter will raise the tr ensemble evenly, thereby making possible the lift-shift-lock manipulation one-handedly.

Desirable properties for all materials to be used in the assemblies of the invention are: constancy of shape and dimension despite atmospheric differences, corrosion resistance, durability, and low cost.

Low density is not, generally speaking, a critical requirement for materials to be used for parts which are motionless-in-use, i.e. which do not move during playing.

For action parts properties additional to those above designated include: high strength-to-weight ratio, high resistance to deformation, and anti-friction.

A recently developed material which appears to have exceptional qualifications for use in the invention, especially for tr key bodies, spacers, etc. is that which is known as "low pressure polyethylene" and is exemplified in Belgian Patent 533,362. It is believed that an ethylene polymer currently obtainable from Phillips Chemical Company of Bartlesville, Oklahoma, under the trade name "Marlex 50" also belongs in the same or a similar category.

According to such information as applicant has been able to acquire, said "low pressure polyethylene" is highly suitable not only for use in the instant invention but also for the fabrication of piano and organ key levers and ivories generally. This is because, on the basis of said information, it weighs less than water, has almost zero variation with humidity, has inherent antifriction and abrasion resistance properties, is durable, rigid and tough, is easily extruded, molded or machined, can be heat-sealed if desired, and can be produced cheaply.

For imparting an antifriction surfacing to metal parts use can be made of "Teflon" emulsions comprising polymers of tetrafluoroethylene such as identified in U.S.P. 2,230,654 and U.S.P. 2,695,880; such emulsions being applied as coatings to metal parts, and being baked on the metal at temperatures of the order of 400° C., in accordance with practice well known to workers in the metal coating art. Said "Teflon" emulsions are currently obtainable from E. I. du Pont de Nemours & Co., of Wilmington, Delaware.

Referring again to the tr's of FIGS. 1–10 and 12–24, it may be observed that the end arms of their shiftable frames may be omitted, and the lift-shift manipulation be done by using one or more of their keys as lifter keys; in which case the terminal tr key spacers (18 and 52) should be replaced by, or take the form of shiftable frame end pieces inter-uniting the tubes on which the tr keys are fulcrumed with the tr keys' lifter bars. By making such frame end pieces thin, so that they will occupy the locking furrows (27 in FIGS. 1–2) in the manner of end arms 9 and 10, and thus obviating need for such end arms, the number of tr keys can be proportionately increased, i.e. in situations where terminal space is at a premium.

In regard to the pivoting of the levelizers of said figures or those of FIGS. 26–27, it may be remarked that a variety of types other than the ones above described can be used. E.g., merely looping fine copper wire or strong thread through eyes in the levelizer rears and adjacent guide channel walls will do. In fact, merely pressing a thumb tack through the channel walls so that it freely penetrates the eye of the levelizer will suffice; or providing the levelizer with transversely protruding lugs in place of an eye, said lugs being dimensioned so as to fit permanently in complementary transverse grooves in lower portions of the rears of the channel walls, e.g. after being squeezed into place in said grooves.

With further reference to FIGS. 26–28 it may be noted that where support for the tr assembly is derived from the host keys collectively, the terminal portions of the fixed frame or also of the shiftable frame can advantageously be made hollow, so as to minimize the load on terminal series of host keys.

Turning again to FIG. 31, it will be apparent that where support is derived from collective upforce of host ivories via seating of rearward frame structure on them at loci farther rearward than said center of gravity, the usual rearward sloping of host instrument ivories will inherently contribute stability against frontward displacement; as also will be normal rearward component of a player's finger force during use, where the assembly comprises playing keys of its own. In the latter case an overall length equal to at least three times the assembly's octave length will be a further stabilizing factor, especially when coupled with an overall weight amounting to at least one (better 1¼) ounce per $$\frac{oct}{12}$$

of said overall length.

Referring to front guide pins 163 and 164 of FIGS. 34 and 44, so far as applicant is aware it is broadly new to provide a fixed, non-shiftable bench of $$\frac{oct}{12}$$

front guide pins (or sleeves) for cooperation with complementary such sleeves (or pins) comprised in a bench of tr keys. That is, in the tr keyboards of the prior art presently in mind, $$\frac{oct}{12}$$

spacing of the tr keys' frontward portions is accomplished either by mounting the tr ivory caps or flexing leaf or tongue spring pieces whose rearward portions are securely (not free-swingingly) anchored in tr frame rear structure, or by use of a front longitudinal member of a shiftable frame as a carrier for the pins; and not by using a bench of fixed $$\frac{oct}{12}$$

guide pins which is not shifted along with the bench of tr keys which it serves.

If desired, adjustable structures like or analogous to pins "16" of Hanson Jr. U.S.P. 2,192,077 can be provided for delicate adjustment of under levers such as 153 of FIG. 34, 238 of FIG. 51 or 290 of FIG. 55.

Novel subject matter disclosed but not claimed herein is being claimed in continuational application S.N. 116,364, filed June 5, 1961.

It will be apparent that many changes in the physical embodiments of the invention and its novel aspects may be made within the scope of the appended claims without departing from the spirit of the invention.

I claim:

1. A transposing device for a keyboard type musical instrument comprising a first frame having an anchor means extending therealong, a pivot means slidably secured to said anchor means, a plurality of keyboard type keys pivoted to said pivot means, said pivot means and said plurality being slidable as a unit along said anchor means, and said first frame having lock means thereon, which lock means are located rearwardly of the vertical plane which includes the fronts of the white keys of said plurality; a liftable frame, locking means on said liftable frame complementary to said lock means on said first frame, said locking means being disposed to engage said lock means on lowering of said liftable frame and to become disengaged from said lock means on lifting of said liftable frame; keys-levelizing means associated with said first frame, said plurality of keys being respectively yieldably supported by said keys-levelizing means at a substantially common elevation; and said liftable frame comprising a frame member extending longitudinally thereof, the elevation of which frame member is higher than said common elevation; whereby when said first frame is positioned on a conventional keyboard type musical instrument and the transposing device properly adjusted, actuation of said keys may produce automatically transposed music on said instrument.

2. The transposing device of claim 1 wherein said pivot means includes a tube on which said plurality of keys are pivoted and which tube encircles said anchor means.

3. The transposing device of claim 1 wherein said frame member is located frontwardly of said pivot means and said liftable frame is liftable independently of said plurality of keys.

4. The transporting device of claim 1 wherein said first frame contains a plurality of guide channels and said keys-levelizing means include levelizers which are respectively held in rearward portions of said channels and are disposed for reciprocation in said channels.

5. The transposing device of claim 1 wherein said frame member carries frontwardly extending spacers which are motionless in use and are disposed for maintaining said keys in parallel co-alinement; said spacers respectively occupying key-to-key spaces between said keys.

6. The transposing device of claim 1 wherein said lock means are located rearwardly of the vertical plane which includes the fronts of the black keys of said plurality.

7. The transposing device of claim 3 wherein said frame member overlies said plurality of keys and is disposed for being raised by lifting of at least one of said keys, thereby disengaging said locking means from said lock means.

8. The transposing device of claim 3 wherein said frame member underlies said plurality of keys and is disposed for being raised into lifting engagement therewith, and for sustaining them in lifted position during sliding of them and said pivot means as a unit along said anchor means.

References Cited in the file of this patent

UNITED STATES PATENTS

| | | |
|---|---|---|
| 297,222 | Bohrer | Apr. 22, 1884 |
| 427,826 | Boos | May 13, 1890 |
| 446,289 | Holmstrom | Feb. 10, 1891 |
| 718,691 | Brambach | Jan. 20, 1903 |
| 904,730 | Scurfield | Nov. 24, 1908 |
| 1,107,783 | Goss | Aug. 18, 1914 |
| 1,199,367 | Fromm | Sept. 26, 1916 |
| 1,657,169 | Mayhew | Jan. 24, 1928 |
| 2,505,608 | Edwards | Apr. 25, 1950 |
| 2,562,670 | Koehl | July 31, 1951 |

FOREIGN PATENTS

| | | |
|---|---|---|
| 13,674 | Great Britain | 1908 |